(12) United States Patent
Lesur (10) Patent No.: US 8,448,853 B2
(45) Date of Patent: May 28, 2013

(54) DATA MEDIUM, IDENTITY DOCUMENT AND CORRESPONDING SECURITY-PROTECTION METHOD

(75) Inventor: Jean-Luc Lesur, Bras (FR)

(73) Assignee: Gemalto SA, Meudon (FR)

( * ) Notice: Subject to any disclaimer, the term of this patent is extended or adjusted under 35 U.S.C. 154(b) by 418 days.

(21) Appl. No.: 12/084,941

(22) PCT Filed: Nov. 13, 2006

(86) PCT No.: PCT/EP2006/068407
§ 371 (c)(1),
(2), (4) Date: May 6, 2009

(87) PCT Pub. No.: WO2007/057375
PCT Pub. Date: May 24, 2007

(65) Prior Publication Data
US 2009/0218396 A1  Sep. 3, 2009

(30) Foreign Application Priority Data
Nov. 15, 2005 (FR) ...................................... 05 11581

(51) Int. Cl.
*G06K 19/00* (2006.01)

(52) U.S. Cl.
USPC .................. 235/380; 235/375; 705/5; 705/35

(58) Field of Classification Search
USPC .............................. 235/375, 380; 705/5, 7–11
See application file for complete search history.

(56) References Cited

U.S. PATENT DOCUMENTS

| 4,765,656 | A  | * | 8/1988 | Becker et al. .................... 283/70 |
| 5,820,971 | A  | * | 10/1998 | Kaule et al. .................... 428/209 |
| 7,070,095 | B1 | * | 7/2006 | Gandel et al. .................. 235/380 |
| 7,207,494 | B2 | * | 4/2007 | Theodossiou et al. ........ 235/487 |
| 2004/0198858 | A1 | | 10/2004 | Labrec |

FOREIGN PATENT DOCUMENTS

| EP | 0 219 012 A2 | 4/1987 |
| EP | 0 230 497 A1 | 8/1987 |

OTHER PUBLICATIONS

PCT/ISA/210.
PCT/ISA/237.

* cited by examiner

*Primary Examiner* — Michael G Lee
*Assistant Examiner* — Matthew Mikels
(74) *Attorney, Agent, or Firm* — Buchanan Ingersoll & Rooney PC (57) ABSTRACT

A data medium has at least first and second parts joined together, each having an outer face turned towards the outside and a hidden inner face. At least one of the first and second parts bears, at a certain distance from the outer faces, hidden markings corresponding to personalization data. This first part and preferably the second part of the medium are, at least locally, opaque with respect to through-transmission of laser radiation liable to modify the hidden markings.

17 Claims, 5 Drawing Sheets

DATA MEDIUM, IDENTITY DOCUMENT AND CORRESPONDING SECURITY-PROTECTION METHOD

The invention relates to the security of information or data media which it must be impossible to alter, or modify, so as to prevent such media from being fraudulently used.

A problem which is intended to be remedied here relates to the security of personalization data inscribed, transferred or incorporated on such media.

The possibility of modifications, alterations or deletions of such data which are customized to the holder, typically a physical person or a group of such persons, should be avoided or at least such operations should be difficult to perform.

A solution provided here consists in the fact that the data medium concerned, which bears the data to be protected at least comprises first and second parts joined together, each having an outer face turned towards the outside and a hidden inner face, at least one of the first and second parts bearing at a certain distance from said outer faces, hidden markings corresponding to personalization data. In addition, the first and second parts of the media shall preferably be at least locally opaque with respect to the through-transmission of laser radiation liable to modify said hidden markings.

As the personalization is generally performed through a surface above the markings, the at least locally opaque parts of each medium are areas which cover or are substantially facing such markings. The substantially opaque areas thus sense the radiation liable to modify or complete the marking. Therefore, they prevent the radiation from reaching the existing markings. The opacity of the medium sheets is locally placed at least at the level of the marking.

The risks of fraud will thus be noticeably restricted.

Such a medium bearing secured information can more particularly be used as an electronic identity document such as an identity card or the sheet of a passport, an access badge, a bank card, and identification badge.

In the field of secured media, such as cards or badges, (both terms will be indifferently used here), it is known to coat same, on at least one of their faces, with at least one layer of coating typically made of a flexible material and of a plastic material different from that of the card body.

It has been noted that it is then possible, most of the time, and without it being subsequently detectable, to peel off the film and then to have a direct access to the information or data which had previously been transferred to the medium.

Now, if such data are personal and must not be modified or deleted (and more particularly made non-visible), this is a problem as long as a possibility of forgery exists.

An object of the invention is thus to avoid such situation, the above-mentioned characteristics aiming thereat.

With respect to the above, it is advisable that:

the opacity to daylight of the markings and the medium thereof, or at least of said first and second parts, is adapted so that, in daylight, at least a part of said hidden markings is not visible by reflection but is, on the contrary, visible by transparency through the medium.

and/or said medium further comprises other markings corresponding to personalization data visible by reflection in daylight, and/or such medium includes a first part of the markings corresponding to personalization data specific to the holder, inscribed in or on such medium and visible from the outside environment and to a human eye, by reflection in a first visible light, and a second part of markings corresponding to said personalization data which corresponds to said hidden markings and which is still visible from the outside environment and to a human eye, by transparency through the medium and/or in a second specific light different from that which makes said first part of the markings visible, said first and second parts of the markings and the medium, or at least the first and/or second parts thereof being adapted therefor, and/or the hidden markings corresponding to personalization data are borne by at least one of said first and second parts of the medium through at least a hidden inner layer, on said markings are inscribed and which is transparent and/or sensitive to a laser beam and/or adapted to a D2T2 and/or an ink jet marking and/or to other personalization techniques.

Preferably, in such situation, the more or less opaque characteristic of the medium, the hidden markings and the second specific light will be adapted so that the visualization of such hidden markings corresponds to at least one of the following situations, visualization by transparency through the medium, visualization by reflection by a light in a predetermined range of wavelength or wavelengths and/or intensity or intensities which is or are different from that or those of said first light.

For a convenient utilization, a reduction in the manufacturing costs and a mass application, the visualization by transparency with a back-lighting appears to be a privileged solution.

With respect to the whole or part of the above-mentioned objects, the following manufacturing conditions of the card will be favored by preferably providing that:

the markings corresponding to personalization data and/or the material or materials of said first and second parts of the medium are adapted so that such first and second parts are closely welded together on the side of their respective inner faces, and/or the material or materials of said first and second parts of the medium are adapted so that such first and second parts are closely welded together on the side of their respective inner faces, and/or the material of said first part of said second part of the medium has substantially the same melting temperature as that of the other part of the card body, and/or that the material of the first part of the medium is identical to or chemically compatible with that of the second part so that the first and second parts of the medium can be welded together.

It is further advisable that:

said hidden and not hidden parts of the markings are located in different, not superimposed areas, of the medium, and/or that said first and second parts of the body of such medium and the markings thereof are adapted so that the first and second parts of the medium closely molten together cannot be separated since they are closely molten together, unless said parts of the medium and/or the markings thereof are deteriorated.

and/or when said parts of the medium are closely joined together, at least one part of such markings is inaccessible since it is located inside the medium, at a certain distance from the outer face of the constituting part thereof, and/or when the medium is obtained, with said parts thereof being closely joined together, said hidden markings and/or the medium area on such markings are existing can resist a modification of said markings at a certain distance from the card without any contact with the card body, because of the constitution and/or the opacity of such parts of the medium and/or the thickness thereof required for reaching such hidden markings.

If at least one of the parts of the medium is covered by a protective film as mentioned hereabove, and if it is desired to prevent or at least to make more complex the attempted forgery of the marked data and thus, as a whole, of the medium, it is eventually advisable that this coating film or each coating film is:

transparent, chemically incompatible for being welded to that/those of the first and second parts of the medium, and/or flexible.

Parallel to the secured medium, card or badge which has just been mentioned, another aspect of the invention relates to a security-protection method wherein it is advisable to:

use as a medium at least first and second parts having an inner face and an outer face, and the physico-chemical characteristics of which will be defined to secure, within such medium, a close junction between such parts at least by their said respective inner faces, as well as an opacity with respect to the through-transmission of laser radiation liable to modify or forge said markings corresponding to personalization data.

at a certain distance from the outer face of said first and second parts of the medium, to perform and/or to position said markings on at least one of such parts of the medium, such markings being adapted to allow said close junction between said parts, and to carry out the close junction between said parts of the medium, thus hiding the markings and protecting same against forgery or a laser modification.

As an alternative, said markings or only some of them can be made and/or placed on the transferred layer in which said markings are inscribed (and which is therefore transparent and/or sensitive to a laser beam and/or adapted to the D2T2 and/or ink jet marking and/or to other personalization technologies) and which is further adapted to be closely joined to said parts of the medium, such hidden markings being adapted to allow the junction of the transferred layer/opaque parts of the medium.

Preferably, this close junction will be performed by welding and/or gluing, with the materials and the markings having been chosen so that such close junction consists in a welding and/or a gluing making it possible to separate such bodies 15a, 15b which constitute the card body.

If the device is welded, the later will preferably be carried out by chemical reaction between the material and/or the materials and thus without any deposition of additional fusible composition.

Besides, for the required protection of the card it is advisable to choose:

the constitution, and/or the thickness of said parts of the medium required to reach at least a part of said hidden markings corresponding to personalization data:

and/or the opacity of such parts of the medium to the penetration of at least one light beam such as in particular a laser beam liable to modify or change such hidden markings, so that, when the medium is joined, with said hidden markings being integrated within said medium, said medium can resist a modification and/or an alteration of the hidden markings by said light beam.

The reference made to laser hereabove results from the fact that it is typically a currently used source for a fraud or an attempt to fraud more particularly on identity cards, secured badges and passports.

Now, with the solutions described hereinunder, such frauds will be resisted whatever their origins, be it by trying to mechanically reach the marking area of the personalization data, by attempted delamination of the parts of the concerned medium, cutting, or by means of a remote approach via light beams such as a laser beam as mentioned above or in the field of the infrared or the ultraviolet, with in particular some specific marking inks.

With a view to giving even more detailed information, additional details for use will now be given as non limitative examples and more particularly with drawings provided as illustrations only and in which.

In the following, the data medium is a card, here a rather rigid identity card. This is not a limitation. It could be a flexible passport sheet or any other sheet.

Figure 1:
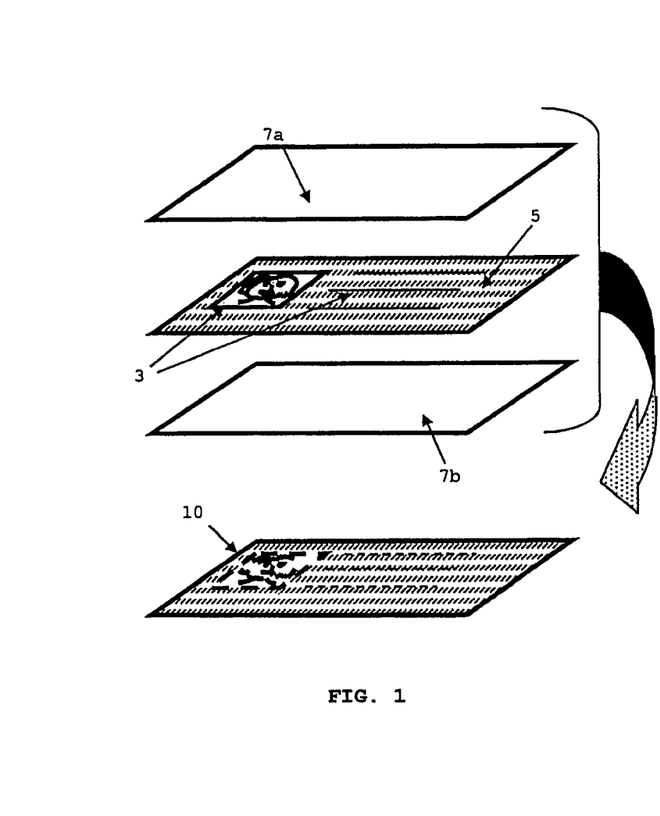
FIG. 1 schematically illustrates a possible embodiment of a card or a badge according to a known prior art.

In FIG. 1 is illustrated a card or a badge 10 bearing personalization data 3 which are marked therein or thereon.

Such data identify the holder thereof and are thus personal to the regular holder of such card.

The thus personalized card 10 may have been made from a card body 5 which is relatively rigid on both opposite faces of which an upper coating film and a lower coating film 7b have been placed.

Typically, the junction of such three elements 5, 7a, 7b has been made by hot rolling.

The personalization marking 3 has been previously carried out on at least one of the faces of the card body 5 for example through the deposition of an ink or any pigment of the appropriate marking type.

Typically, the card body can be made of PVC (polyvinyl chloride) PC (polycarbonate), or even PET (polyester).

This usually concerns a material relatively opaque to daylight.

The coating films 7a, 7b are typically transparent, flexible, made of plastic such as PVC.

The materials of such films 7a, 7b and of the card body 5 are different and usually a, for example heat sensitive, glue makes it possible to join such elements together. When the hot rolling is completed the unit card 10 is obtained.

Figure 2:
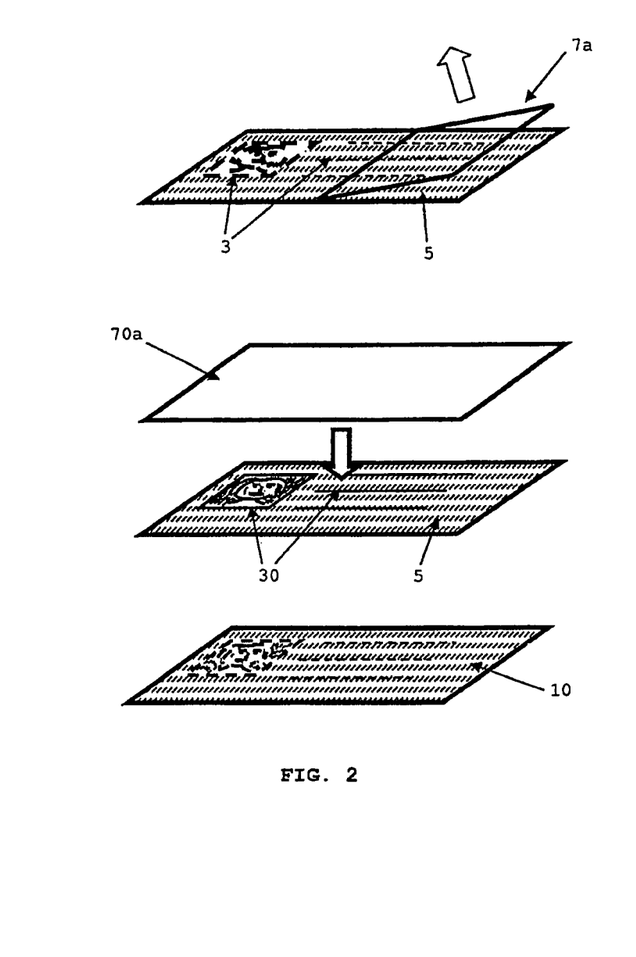
FIG. 2 shows the possibility of forging the card or the badge in FIG. 1 according to the prior art.

FIG. 2 shows that the delamination of such a card is possible: one of the films such as 7a, in particular, can be peeled off and removed from the card body 5.

A forger has then access to the part 3 bearing the markings on the card. Using means such as a chemical etching or a laser beam, he/she can delete or erase or replace whole or part of such personalization markings 3.

If the removed film was bearing some information or data it can modify them, change a part of them, and forge the remainder . . . on a new film 70a.

Such new film 70a, which bears markings or not, and which can be identical to the film 7a is then replaced on the card body 5 while possibly bearing new markings 30 which may, if so desired, personalize the card 10 in a different way now.

When the film 70a is joined to the body 5, the new card 10 which has been modified and a priori forged may appear as shown at the bottom right in FIG. 2 as genuine as the original, at the bottom left in FIG. 1.

Figure 3:
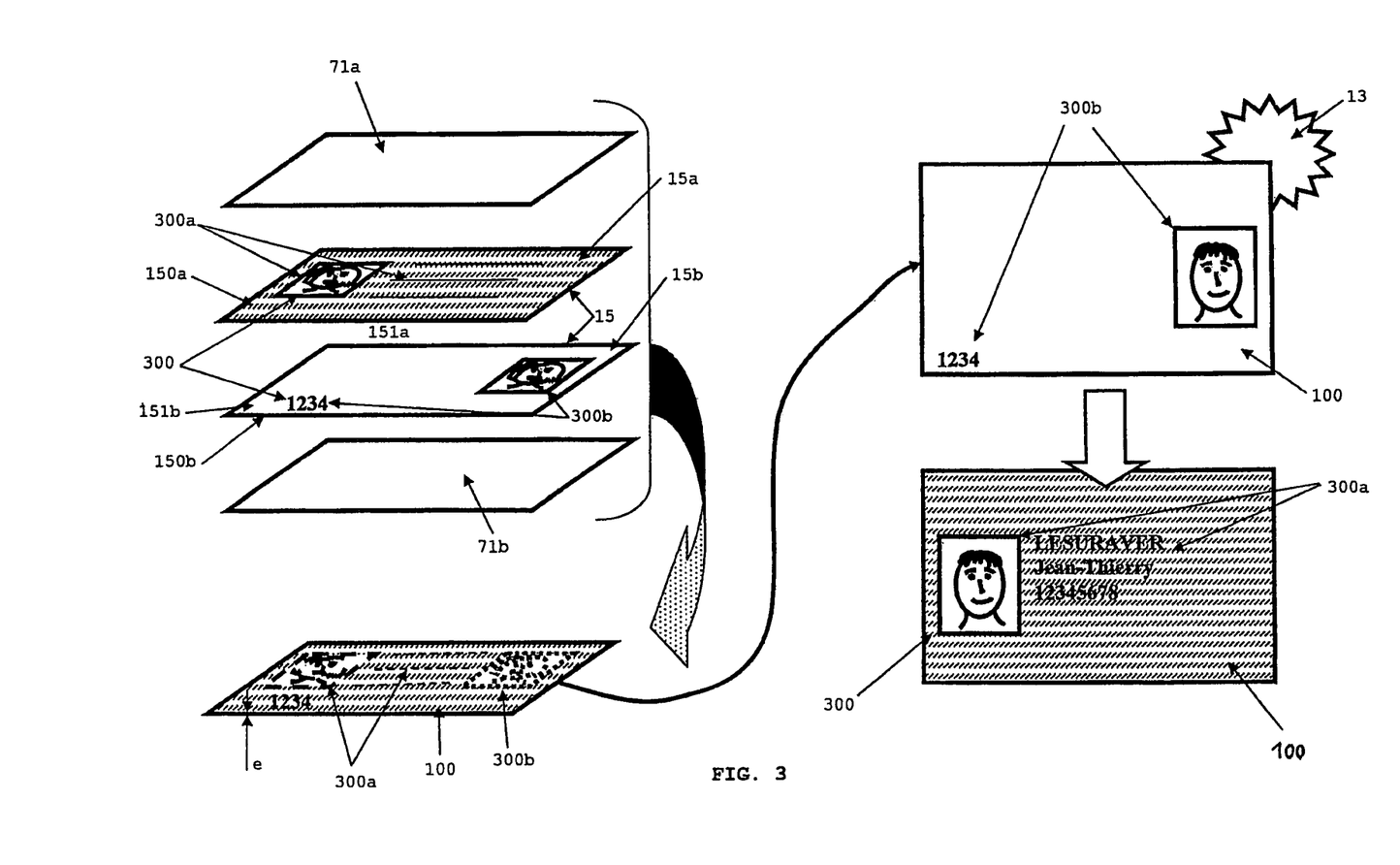
FIG. 3 shows the embodiment of the card body according to the invention and also shows on the one hand information which are visible only in a particular light (here back lighting) (at the top right of the Figure) or in a "normal light" by reflection (bottom right)

An illustration of a solution aiming at preventing such a situation is shown in FIG. 3.

In such FIG. 3, the card body or medium 15 is made of several parts in the direction of thickness. In this case it involves 2 parts 15a, 15b. Such 2 parts each define a smaller thickness layer than the global thickness e of the body 15 formed by the junction of said two parts, inner face against the inner face 151a, 151b.

These parts or sub layers 15a, 15b can be made of rigid or semi rigid plastic material.

Preferably, they are made of the same material or materials chemically compatible for being directly or indirectly welded (refer to FIG. 5) at an a priori common melting temperature.

The close junction between both parts 15a, 15b requires no additional material which a priori reduces to zero the possible delamination or separation between them, when such parts are assembled together.

Prior to such junction, at least one of the parts, 15a, 15b will receive the markings corresponding to personalization data 300 required and which are specific to the card holder (code identification number or numbers, picture, etc).

At least a part of such markings will be made at a distance from the outer face 151a, 150b of the parts 15a, 15b of the card body and will then be hidden when the card or originally the medium concerned is joined.

This is true for the portion 300b of such markings which is, a priori, visible to the human eye only in particular visualization conditions. As a matter of fact, it can be seen, at the top right of FIG. 3, that a back lighting through a hole 13 reveals the markings 300b of the card 100 through both parts of the card 15a, 15b whereas they are not visible in a "normal" lighting by reflection at the bottom right of the same FIG. 3.

Such "normal lighting" which, preferably, reveals only the portion 300a of the markings corresponding to personalization data is here the visible light, the sunlight or an equivalent via a lamp.

In the absence of an appropriate back lighting 13 it is impossible to see the markings 300b which remain hidden.

The light 13 can thus be a visible light such as the sunlight.

Thus, it can be imagined that placing the card 100 in a back lighting will reveal the hidden markings 300b, whereas the outer markings 300a can be revealed permanently, generally in daylight or in the sun spectrum, and more particularly in both above-mentioned situations of reflection and transparency.

An exposition of the hidden portion 300b of the markings under other lighting conditions could be provided for: high light intensity, wavelengths which are not visible to a human eye and thus out of the daylight spectrum.

But the back lighting or, in other words, the visualization by transparency in daylight, through the layers constituting the card 100 is a priori privileged more particularly with a view to facilitating the making of the card and the authenticity checking.

To obtain this preferred effect of a selective visualization at least of the hidden markings 300b, the structural, in particular the chemical constitution will be selected, as well as the thickness of such parts of the card body 15a, 15b which are required to reach certain markings, as well as the opacity of the same parts of the card body to the penetration of a light ray liable to modify or to change such markings (such as a laser beam so that the parts of the card body 15a, 15b then closely joined together as mentioned hereabove resist a modification and/or a change of said markings 300b by such light beam.

In parallel, it will be checked that the characteristics for making such parts of the medium (card body as well as the markings themselves) make it possible to see the latter under the conditions already mentioned.

Thus, the visualization of such markings corresponding to personalization data 300 under the conditions planned will be possible and fraud will be prevented by making the access to at least some of said markings (at least the abovementioned selectively visible hidden markings 300b), difficult (and preferably impossible) in order to prevent their being forged typically in connection with a previous deletion of the genuine markings more particularly through of a distant etching with a light typically with a laser radiation.

The best effect desired will be obtained by modifying:
the localization of the markings areas 300a, 300b (inner face and/or outer face or even a possible positioning in the thickness),
the selection of the material or materials of the parts of the card as well as those of the markings (pigments, ink),
and in connection with the above, the characteristics of thickness and opacity of said parts of the card body.

The whole or part of the markings corresponding to personalization data 300 will be typically made with pigments or a printing ink, such as with the D2T2 (dye diffusion thermal transfer) ink jet or laser technique, a priori before said parts of the card body 15a, 15b are joined together which will make it possible, more particularly, to mark the inner face 150a and/or 150b thus making a subsequent forgery even more difficult since said parts of the card body are designed to be impossible to separate, and in that their thickness and own characteristics are obstacles to the known outside attacks.

In the example shown, the markings 300a which are permanently visible in sunlight have been made on the outer face 150a on the part 15a of the card body, whereas the hidden markings which are security markings and which have a selective visualization 300b have been made towards the inner face 151b of the second part 15b of the card body. Here on the inner face 151b.

If, as this is typically the case with the current marking inks, the marking material or materials has or have a negative effect on the close junction to be obtained between the parts of the card body 15a, 15b, the quantity of (the extent and/or the density) of the surface markings will be carefully limited to the interface between both parts, 15a, 15b, i.e. the place on the inner faces 151a, and/or 151b, or in close proximity thereto, in thickness.

As regards the global security and more particularly security cards and badges it is reminded however, that it is preferred that all or at least most of the personalization markings 300 are on the side of the inner faces 151a, 151b of said parts 15a, 15b, or close thereto.

At the right top of FIG. 3, personalization data 300d can be seen as they appear in the chosen selective light.

Although not shown, the other markings 300a can also be visualized at this moment since the (genuine) card 100, reflection characteristics exist, as can be seen at the right button of the same FIG. 3.

In other words, in the illustrated example and when the card 100 is made and ready for use:
the card is looked at either "normally", typically in sunlight and out of the particular conditions of the visualization of the additional security hidden markings 300b, as is the case in the bottom right of such Figure and then only markings 300a can be seen, or the card is selectively illuminated (such as by a back lighting 13) and then said security hidden markings at least 300b are shown as shown on the top right of FIG. 3, both markings 300a, 300b thus being visible.

As regards some manufacturing constraints and as regards the easy utilization of the medium concerned, the first and second parts 300a, 300b of the markings 300 will be placed in two different areas which are not superimposed on the card as is the case on the illustration of FIG. 3.

As regards the markings 300, it will also be noted that as an authenticity checking element, it is advisable to use a code (refer to code number 1234 at the top right in FIG. 3) in at least one common element between the marking parts 300a, 300b such as a picture of the authentic card holder (refer to FIG. 3 again), or a signature or a card controlled and recorded number.

The secured card 100 can also include in addition to said parts 15a, 15b having a medium with a selective thickness, opacity and constitution, at least an additional coating film or layer 71a and/or 71b (FIG. 3) which is applied and joined on the outer face 150a, 150b of the assembled card body 15.

Such films 71a and/or 71b can be identical to the abovementioned films 7a, 7b, 70a. They will first be typically transparent to light radiations as mentioned above for the considered readings by reflection and/or by transparency will typically be made of flexible plastic materials and thus a priori in a different material from that of the abovementioned parts of the card body 15.

Here, each of these films 71a, 71b provided on both opposite outer surfaces of the card body 15 has no data or information markings.

However, at least one could bear such markings since the forgery thereof is not likely to be able to interfere with the abovementioned markings corresponding to personalization data 300b inscribed in the core proper of the body card 15 and are inaccessible and thus it is impossible to forge them.

Figure 4:
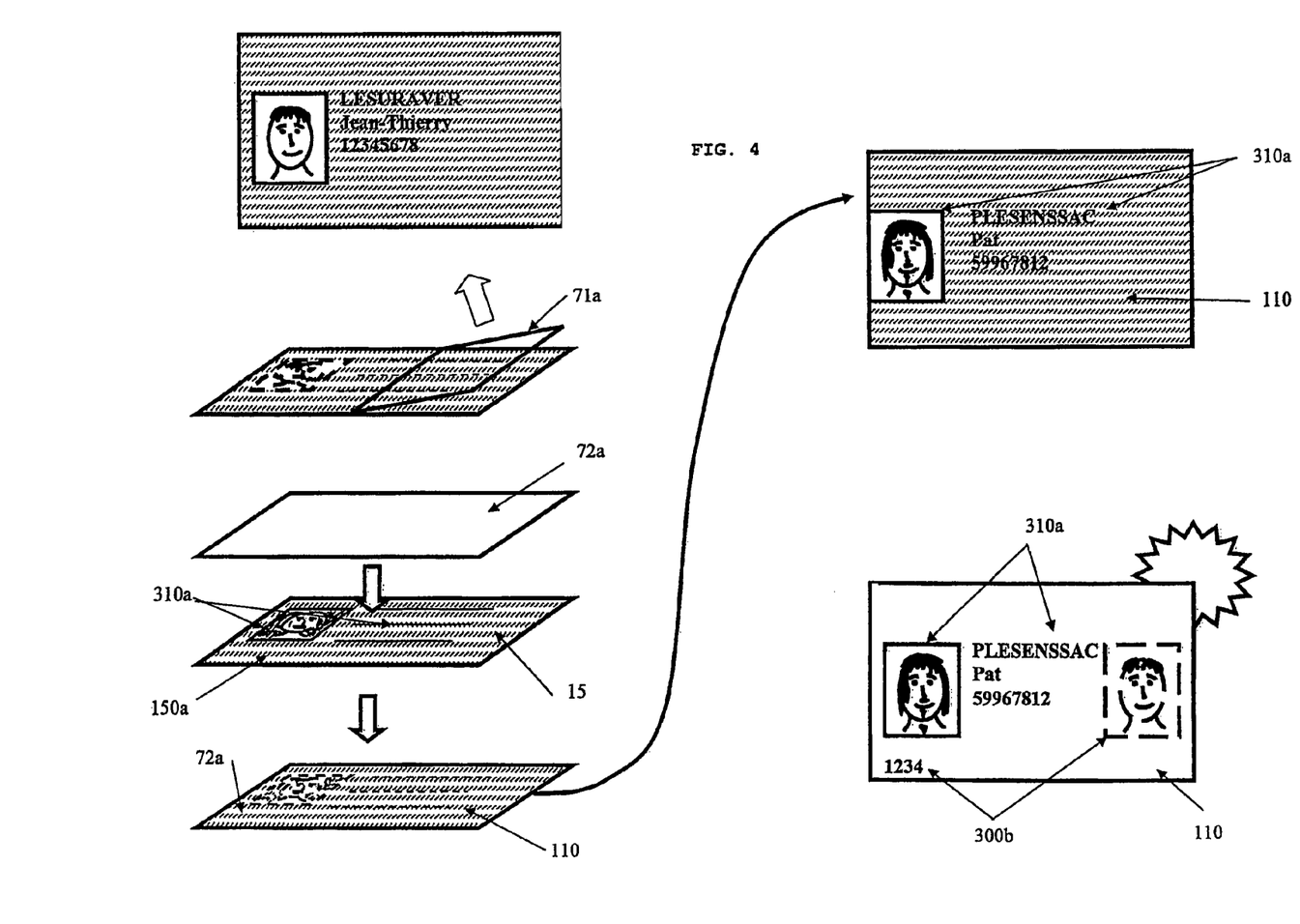
FIG. 4 is a diagram of an attempted forgery of the car of FIG. 3 illustrating the result obtained which shows the detectable characteristic of such attempt and thus the card security, and FIGS. 5, 6 and 7, each, show a cross-sectional exploded view, of a secured data medium card or sheet according to what is recommended here.

In FIG. 4, the film 71a which is not closely joined to the card body 15 (of course already assembled) is fraudulently peeled off.

As a substitute to this film 71a, a new film 72a is used and joined on the corresponding outer face. Here, it is the face 150a from which the markings 300a have been removed, supposing, as in the example illustrated on the left of FIG. 3, that such markings had previously been made on such surface using a printing ink liable to be etched with known etching means such as a laser beam, chemical alteration.

In this assumption, the forger can choose to make new markings (in 310a) on said surface 150a before replacing the flexible transparent protective film 72a with substitution markings specific to the card holder (code, identification number or numbers, picture) such as those mentioned in the top right of FIG. 4 or such substituted markings 310a thus replacing in an apparently non-detectable way the initial genuine marks 300a (refer to Figure a, bottom right or bottom left)

When the film is joined with the card, the forger thus obtains the forged card 110 in the bottom left or at the top right of FIG. 4 on which the original information 300a of the card 100 of FIG. 3 (bottom right) can no longer be seen by reflection, but forged information of the card at the top right of FIG. 4 can now be seen by reflection in a normal lighting using sunlight or an equivalent.

On the contrary, if such card 110 is looked at in a selective lighting revealing the safety hidden markings 300b then the forged marking information 300a and the genuine marking information 300b which thus show a forgery of the card 110 can be seen at the bottom right in FIG. 4.

As regards the material for each part 15a, 15b of the card body, a selection can be more particularly made in the abovementioned list (PET, PVC, PC and other derivatives); but good results are also obtained with ABS (butadiene and styrene acrylonitrile), without adding any material for the welding or paper, preferably with glue . . . . For the film or the films 7a, 7b, 71a 72a, PET, PVC, PC and other derivatives can be selected.

Preferably, the thickness of the card body 15 will range between 0.05 mm and 10 mm or preferably between 0.1 mm and 1 mm. Each part, 15a, 15b can have the same thickness.

As regards the balance between opacity for the reading by reflection, and transparency in particular for the visualization in a back lighting, a few tests will make it possible to reach the good selection in particular in sunlight.

At least some of the parts 15a, 15b of the card body or even of the film or films can further bear and will particularly integrate complementary security elements such as needle etching, iridescences, holographic means, and filigrees. But such elements are not considered here as markings corresponding to personalization data (referred hereinunder).

Figure 5:
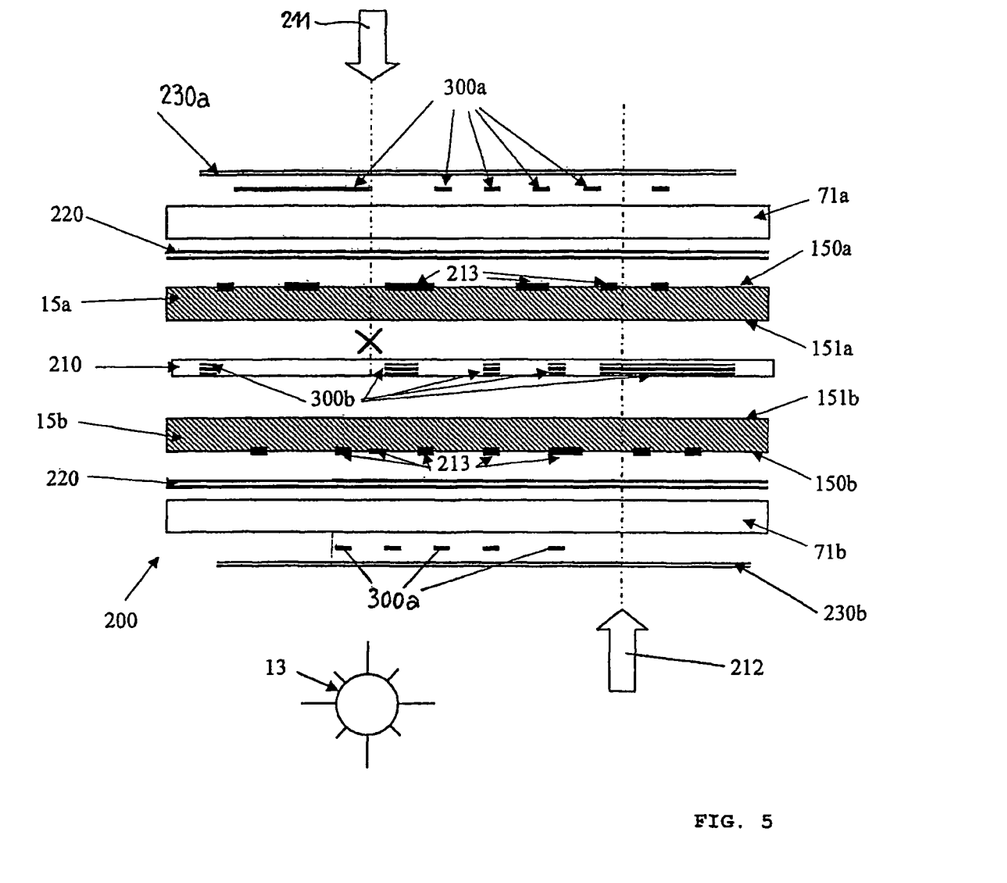

In FIG. 5, the data medium 200 includes the first and second parts 15a, 15b mentioned hereabove between the hidden inner faces 0151a, 151b on which is interposed a transferred layer 210, which received the hidden markings corresponding to personalization data 300b (carbon black incorporated in a PVC, PET or polycarbonate film). Such markings can be made prior to the joining of the layers by laser etching in the core of such layer 210, and thus at a certain distance from the surfaces thereof. A surface marking can also be considered possibly using another known technique.

In addition to being adapted to be closely joined to said parts, 15a, 15b of the medium (the same material or chemical compatibility for a welding), a priori without any deposition material, layer 210 will then be sensitive and thus adapted to a laser and/or D2T2 and/or ink jet marking and/or to any other personalization technology. It can further be transparent more particularly to the sunlight.

The parts 15a, 15b are on the contrary opaque with respect to any laser beam, so as to prevent the hidden layer 210 from being reached when the element 15a, 15b, 210 are closely joined together. Such opacity will be such that at least in daylight, the hidden markings 300b will not be visible by reflection. (Arrow 211) while being revealed by transparency (arrow 212, back lighting 13.)

On the side of the outer face 150a, 150b turned towards the outside environment, the parts 15a, 15b received or bear, from the manufacturing stage, security elements such as needle etches 213. "Appearing" markings 300a can also be found (not shown). Above all, a junction layer 220 is applied such as, in particular, an adhesive for the joining, here on either side, of the transparent protection film 71a, 71b.

Further out, a transparent film 230a, 230b typically a fine one can be found.

Appearing personalization data 400a, 400b are seen as being interposed there between.

Typically, each transparent film 230a, 230b will be an adhesive to adhere onto the outer face of the corresponding protective film 71a, 71b, thus protecting the appearing personalization data 300a.

Hereinunder, transparent will mean letting the sunlight through. Thus, in this light, the following can be seen:

by reflection, the data markings 300a and a priori the other abovementioned security elements, if any (such as 213), and, by transparency, the inner markings.

Figure 6:
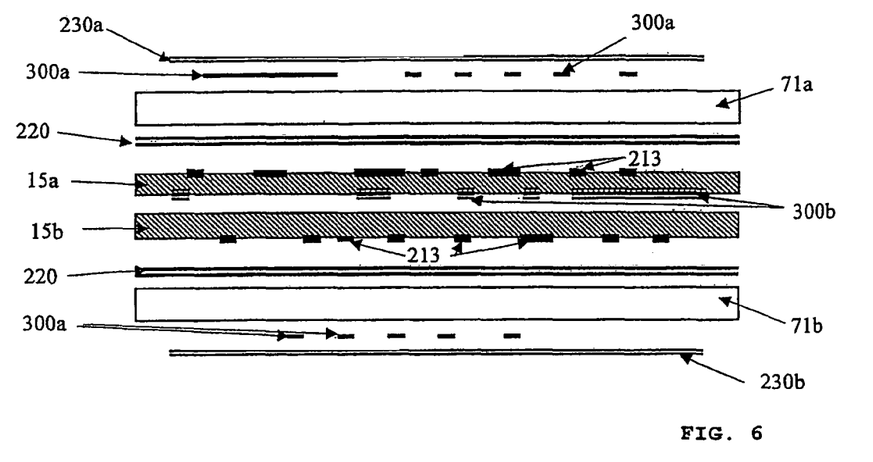

The layered elements and markings of FIG. 5 can be seen in FIG. 6, except for the hidden layer 210 in the core. The hidden markings 300b are directly inscribed on or in at least one of the opaque parts 15a, 15b here at the interface, on part 15a.

Figure 7:
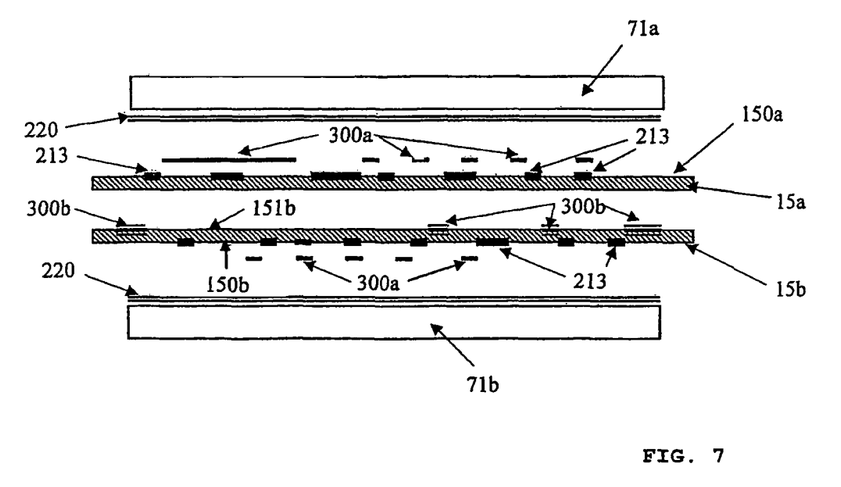

In FIG. 7 as in FIG. 6, except for the fact that the appearing markings corresponding to the personalization data 300a are interposed between each part 15a, 15b of the medium and a corresponding junction layer 220 which is itself interposed between the concerned part 15a, 15b and the corresponding protection film 71a,71b. Besides, the markings 300a have been inscribed on the outer face 150a, 150b of the concerned part 15, 15b, above the security elements 213 already formed on this face. If the cohesion or adhesion are adapted, the junction layers 220 can be omitted.

FIGS. 6 and 7 the conditions of visualization shown in FIG. 5 by the arrows 211 to 112 preferably remain unchanged.

The invention is:

1. A data medium including at least first and second parts joined together, each having an outer face turned towards the outside and a hidden inner face, at least one of these first and second parts bearing, at a certain distance from said outer faces, hidden markings corresponding to personalization data, the first and second parts of the medium being both opaque with respect to the through-transmission of laser radiation liable to modify the hidden markings.

2. A data medium according to claim 1, wherein said markings and at least said first and second parts of said medium, have a certain opacity to daylight and are adapted so that, in such daylight, at least a part of said hidden markings is not visible by reflection but is visible by transparency through the medium.

3. A data medium according to claim 1, further comprising other markings corresponding to personalization data visible by reflection in daylight.

4. A data medium according to claim 1, further including a first part of markings corresponding to personalization data, inscribed in or on such medium and visible from the outside environment and to a human eye, by reflection in a first visible light, and a second part of markings corresponding to personalization data which corresponds to said hidden markings and which its still visible from the outside environment and to a human eye, by transparency through the medium and/or in a second specific light different from that which makes said first part of the markings visible, said first and second parts of the markings and at least the first and/or second parts of the medium, having an opacity to the concerned lighting adapted therefor.

5. A data medium according to claim 4, wherein said first and second parts of the markings are located in two different, not superimposed, areas on the medium.

6. A data medium according to claim 1, wherein the markings corresponding to personalization data and/or the material or materials of said first and second parts of the medium are adapted so that such first and second parts are closely welded to each other on the side of said respective inner faces thereof.

7. A data medium according to claim 1, wherein:
the material of the first part of such medium has substantially the same melting temperature as that of the second part,
and/or the material of the first part of the medium is identical to or chemically compatible with that of the second part, in order to weld together such first and second parts of the medium.

8. A data medium according to claim 1, further comprising at least a film coating the outer face of at least one of said first and second parts of the medium, said coating film being:
transparent,
and/or made of a material chemically incompatible for being welded to that/those of the first and second parts of the medium,
and/or flexible.

9. A data medium according to claim 1, wherein said first and second parts of the medium and the markings thereof are adapted so that such first and second parts cannot be separated since they are closely molten together, unless said parts of the medium and/or the markings thereof are deteriorated.

10. A data medium according to claim 1, wherein the hidden markings corresponding to personalization data are borne by at least one of said first and second parts of the medium through a hidden inner layer, on said markings are inscribed and which is transparent and/or sensitive to a laser beam and/or adapted to a D2T2 and/or an ink jet marking and/or to other personalization technologies.

11. An electronic identity document such as an identification card or a passport sheet comprising the data medium according to claim 1.

12. A method for securing a data medium bearing markings corresponding to personalization data, wherein:
at least first and second parts having an inner face and an outer face are used, the physico-chemical characteristics of which are defined to secure, inside said medium, a close junction between such parts at least by their said respective inner faces as well as an opacity with respect to the through-transmission of laser radiation liable to modify or forge said markings corresponding to personalization data,
at a certain distance from the outer faces of said first and second parts of the medium, the markings are carried out and/or placed on at least one of such parts of the medium, such markings being adapted to allow said close junction between such parts,
and the close junction between said parts of the medium is carried out, thus hiding the markings and protecting same against forgery or a laser modification.

13. A method for securing a data medium bearing markings corresponding to personalization data wherein:
at least first and second parts having an inner face and an outer face are used as media, and the physico-chemical characteristics of which are defined to secure, within such medium, a close junction between such parts at least by their said respective inner faces as well as an opacity to the through-transmission of laser radiation liable to modify or forge said markings corresponding to personalization data,
said markings are inscribed on a transferred layer, and which is transparent and/or sensitive to a laser beam and/or adapted to a D2T2 and/or ink jet marking and/or to other personalization technologies, and which is further adapted to be closely joined to said parts of the medium, on which said markings are carried out and/or placed, and same are adapted to allow said close junction, and the close junction of said parts of the medium and the transferred layer is carried out, thus hiding said markings and protecting same against forgery or a laser modification.

14. A method according to claim 12, wherein said close junction is carried out by welding and/or gluing after having adapted the material or materials and the markings so that such close junction comprises a welding and/or a gluing, thus making it difficult to separate the parts constituting the card body.

15. A method according to claim 14, wherein said close junction is carried out by welding and the welding is performed by a chemical reaction between the material or materials which are incompatible, and thus without any deposition of additional fusible composition.

16. A data medium according to claim 2, further comprising other markings corresponding to personalization data visible by reflection in daylight.

17. A method according to claim 13, wherein said close junction is carried out by welding and/or gluing after having adapted the material or materials and the markings so that such close junction comprises a welding and/or a gluing, thus making it difficult to separate the parts constituting the card body.

* * * * *